March 5, 1968 R. LUCIEN ET AL 3,371,749
SEGMENTED DISC BRAKE
Filed April 20, 1966 3 Sheets-Sheet 3
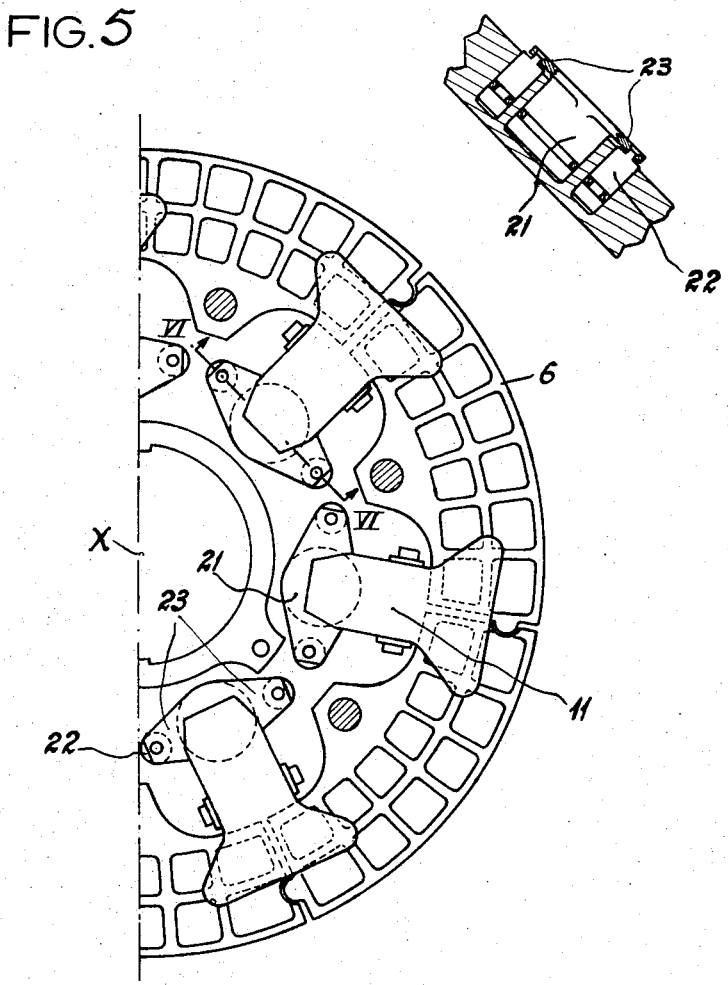

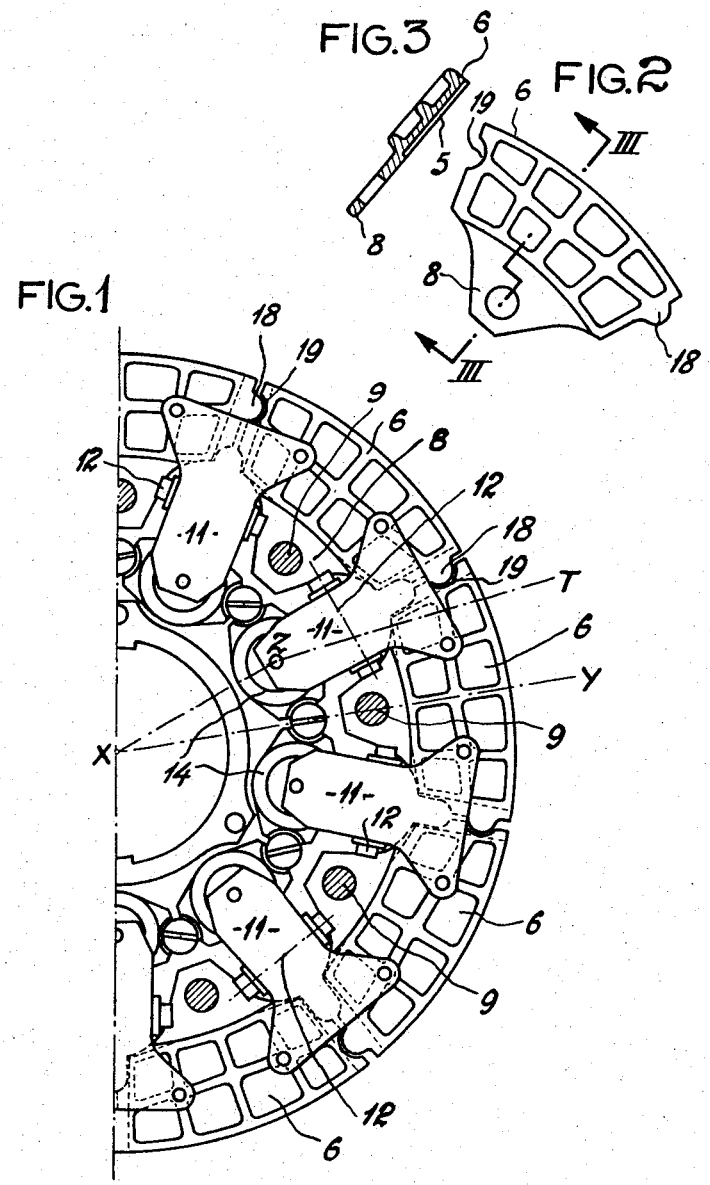

United States Patent Office 3,371,749
Patented Mar. 5, 1968

3,371,749
SEGMENTED DISC BRAKE
Rene Lucien, Neuilly-sur-Seine, and Jean Masclet, Paris, France, assignors to Recherches Etudes Production R.E.P., Paris, France
Filed Apr. 20, 1966, Ser. No. 545,216
10 Claims. (Cl. 188—71)

ABSTRACT OF THE DISCLOSURE

A disc brake having a first rotating unit including at least one braking disc, a second non-rotating unit having a plurality of small individual shoes mechanically independent of each other, each shoe carrying a friction lining which is intimately associated with it without any thermal discontinuity, and a third supporting unit coupling the second unit to the wheel axle thermally distant from the second unit and including actuating means for the shoes.

---

The use of brakes for disc wheels is becoming more and more general for the equipment of vehicles, and in particular for aircraft.

In the first constructions of such brakes, linings of a conventional type were utilized for the linings intended to come into frictional contact with the rotating discs.

However, due to the poor thermal conductivity of these linings, the equivalent in heat of the energy dissipated in braking was stored for the greater part in the discs, and in order to avoid excessive heating of these discs, this led to a multiplication of the number of discs and to attempts to cool them to the maximum possible extent.

The poor conductivity of the linings did however have the advantage that since their supports were not heated excessively, the transfer of heat to certain parts of the brake affected by heat, such as the hydraulic brake control cylinders and the grease of the wheel hubs, was small. Thus, the disadvantages were avoided which would have arisen due to excessive rise in their temperature.

Subsequently, it became possible to improve the performances of disc brakes by employing brake linings capable of absoring part of the heat developed. The result is that a fraction of this quantity was asorbed by the contiguous part of the structure. However, the proportion of energy dissipated in the form of heat and transmitted from the linings to the remainder of the structure was only a limited part of the heat to be evacuated. This was due on the one hand to the method of construction and fixing of the linings to their supports and on the other hand to the fact that it could not be contemplated to exceed a pre-determined temperature in the part of the brake fixed to the axle, this limitation being necessary in order to avoid the drawbacks indicated above, especially concerning the hydraulic control cylinders and the greasing of the wheel hubs.

Even if the diffusion of a larger quantity of heat into the lining carriers had been tolerated, it would however have been necesary for this transmisison to be effected fairly rapidly, that is to say before the discs and/or the linings had been heated to a temperature capable of damaging them. The present method of assembly of the linings to their supports does not permit transmission of heat sufficiently rapidly to achieve this condition. In fact, particularly with the object of facilitating replacement of the linings, use is made of mechanical fixing means: the conductive material of the linings is for example housed in cups which are themselves fixed to the lining carriers by mechanical means, such as riveting. These fixing means only provide an imperfect contact between the said cups and their supports. There may therefore exist in the space a film of air which is a poor conductor of heat.

In addition, even if the contact were perfect, the mere fact of the discontinuity between the two elements creates an obstacle to the transmission from one to the other of the molecular agitation which, as is well known, governs the transmission of heat. This transmission takes place only with insufficient rapidity to follow without delay the rise in temperature of the parts in frictional contact.

In consequence, the invention has for an object a brake in which all restrictions to the evacuation of heat by the lining carriers are eliminated, in particular to the transmission of heat from the friction surfaces to the lining carriers.

The invention has as an additional object the provision of a brake in which heat is prevented from being transmitted to the braking jack and to the wheel hubs.

The invention has for a further object to provide a brake in which, in almost all cases, the number of discs is limited to one only or exceptionally to two, without however excluding from the invention multi-disc brakes in the extreme cases where the latter are essential.

Another object of the invention is to construct a brake which, for the same power, is lighter than the present brakes or which, for the same weight, is more powerful than present brakes.

The invention has the further object of providing a brake which is simple, robust, easy to maintain, and which, due to the fact that it comprises very few discs, is exempt from the tendency of multi-disc brakes to initiate vibrations in the landing gear of aircraft.

Still a further object of the invention is, by virtue of the reduction of the number of discs, to effect a reduction in weight of rotating parts and consequently of the inertia forces encountered.

The brake according to the invention is distinguished from the known brakes by the fact that all restrictions on the evacuation of heat in the lining-carriers imposed up to the present time either by the nature of the linings or by their method of assembly, are removed by the fact that deliberate care is taken in its construction to evacuate from the mass of the lining-carriers a preponderant proportion of the heat developed and to apply to the said lining-carriers the cooling means which have up to the present been particularly applied to the discs; finally, to remove the parts brought-up to high temperature as far as possible from the operating parts of the brake, for the operation of which high temperatures are harmful.

Briefly, the disc brake according to the invention is characterized in that it is constituted by the combination of three units, each having its own function independent of that of the others, namely;

(a) A rotating unit consisting of one or more discs, driven in rotation by the wheel and generating heat to be dissipated, by friction on the linings, while at the same time itself storing and dissipating a part of the said heat;

(b) An active non-rotating unit, comprising a plurality of small individual shoes, mechanically independent of each other, each carrying a friction lining which is intimately associated with it without any discontinuity, in particular by brazing or sintering, so as to ensure without delay, by the linings, equalization of the temperature of this unit with that of the rotating unit, by transmission from this latter unit of the heat created by the friction of the linings;

(c) A support, of light construction and separate from the two units, which couples the non-rotating unit to the axle, thermally distant with respect to the non-rotating unit, and comprising the operating members of the brake.

More precisely, in the active non-rotating unit, each shoe is mechanically independent of the other shoes; each shoe can slide parallel to the axis of the wheel, on a shaft which is individual to this shoe; this sliding movement in the operation of braking is controlled for each shoe by two jacks which each actuate it through a rocker-arm pivoted on a shaft parallel to the plane of the wheel and perpendicular to a radius of the wheel. Each rocker-arm symmetrically actuates the lateral parts of two adjacent shoes, which does not destroy the independence of the shoes with respect to each other.

Similarly, the reaction torque due to braking, which torque tends to cause each shoe to pivot in a plane parallel to the plane of the wheel about its sliding axis, is compensated by a reciprocal support between the adjacent edges of this shoe with the adjacent shoes, following an arrangement which is described in detail later but which also does not destroy the independence of the shoes with respect to each other.

Each shoe is provided on its working face with a friction lining, which, as has already been stated above, is sintered or brazed on its shoe. On its opposite face, each shoe is formed with a plurality of recesses; the recessed form of the individual shoe increases its strength and permits a better dissipation of heat by increasing its free surface.

The metal of the active non-rotating unit is selected from those which combine optimum qualities of heat capacity and conductivity with the characteristics of behavior while hot which make it possible to ensure, at the extreme temperatures of use, the mechanical strength necessary for the resistance of the assembly and for the transmission of the torque. Amongst these metals, beryllium and its alloys occupy an outstanding position.

The support which effects the fixing to the axle surrounds this latter. It contains the control cylinders, and their pistons which transmit the braking effort to the individual shoes by means of rocker-arms. This arrangement enables the elements of this transmission affected by temperature to be placed at a fairly large distance from the parts brought-up to high temperature. Thus, without adversely affecting the operation of these elements, the assembly of the linings and shoes may be allowed to reach a temperature substantially equal to that of the discs themselves.

The support will advantageously be made of a light alloy which is a good conductor of heat, such as magnesium-thorium. By its construction, it only represents a small part of the total weight. In case of need, this support may be protected by appropriate heat insulators against a rise in temperature due to the heat of the two units.

Since the shoes into which flows a part of the heat developed by the energy utilized are fixed or substantially fixed, as they only have to make at the most very slight movements of translation in moving up to the discs, it is easy to cool them by known means.

They may for example be provided externally with fins so as to cool them by convection by utilizing the flow of air created by the speed of the vehicle, or any other means of ventilation.

According to the invention, the proportion of the volumes of the linings and of their shoes will be determined taking into account their physical characteristics in such manner that the temperature in the assembly is as uniform as possible and is substantially that of the discs themselves.

The above arrangements, together with other arrangements according to the invention, will now be described with reference to the accompanying drawings, given by way of examples only and not in any limitative sense. In these drawings:

FIG. 1 is a half end-view of the brake, looking in the direction of the arrow I of FIG. 4;

FIG. 2 shows a front view of an isolated shoe;

FIG. 3 is a cross sectional view taken along line III—III in FIG. 2;

Figure 4:
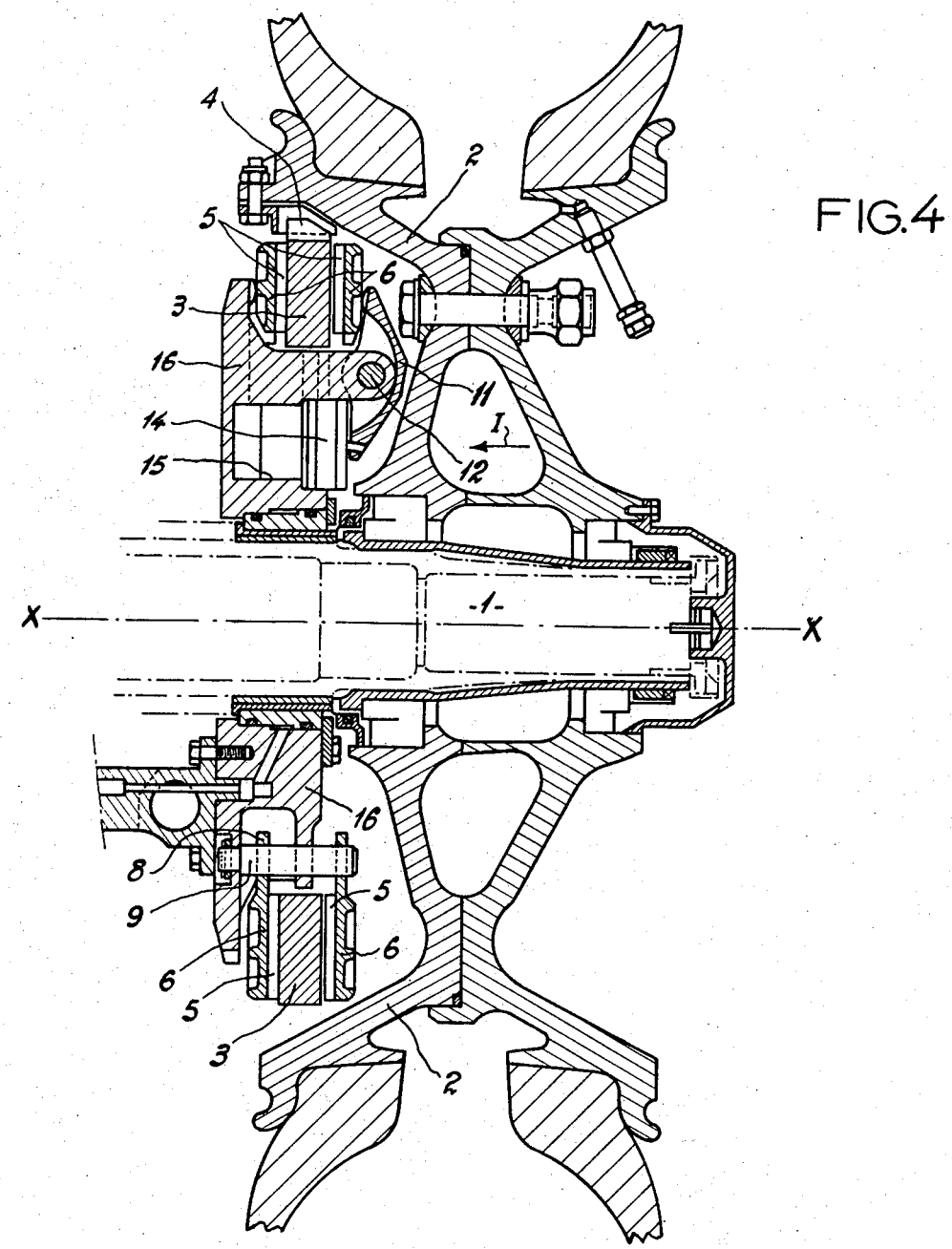
FIG. 4 shows the brake and the wheel in axial section, the lower part being taken along the line X–Y of FIG. 1 and the upper portion along the line X–Z–T of FIG. 1.

FIG. 5 similar to FIG. 1, represents another construction of the brake according to the invention;

FIG. 6 is a partial section taken along the line VI—VI of FIG. 5.

Referring now to FIGS. 1 to 4:

The stub-axle 1 of the wheel 2 having an axis X—X (FIG. 4) is fixed at the end of an under-carriage leg (not shown); the disc 3 is rigidly fixed for rotation with the wheel 2 by means of slides 4, along which it can be moved parallel to the axis X—X of the wheel; against each of the faces of this disc, a series of linings 5 is applied during the action of braking.

The description and drawings relate to a brake with a single rotary disc, but it is clear that the invention is also applicable to a non-rotating disc brake and to a brake with a number of discs.

According to the invention, the linings 5 of each series are individually fixed on brake shoes 6 which are separate and independent, and are angularly equidistant about the axis of the wheel.

This arrangement makes it possible to obtain instantaneous pressures on the disc 3 which are uniform over the whole circumference, irrespective of the thermal deformations generated by the braking action. On the shoes 6 are fixed, without any discontinuity, by brazing or direct sintering for example, brake-linings 5 of the sintered lining type, with a base of a metal which is a good conductor of heat, such as copper. In accordance with the invention, the shoes 6 may be of beryllium.

The tail 8 of each shoe 6 slides on a shaft 9 parallel to the axis of the wheel (FIGS. 1 to 4). Two adjacent shoes are actuated by a single rocker-arm 11 pivoted about a shaft 12. It can be seen that each shoe is thus urged by the braking action on each side of its central line X–Y, which is also favorable to the production of uniform pressures. The rocker-arms 11 are each controlled individually (FIG. 4) by the pistons 14 of hydraulic cylinders 15, bored very close to the stub-axle in a block 16, fixed for rotation and for translation. The rocker-arms 11 are mounted with a clearance on their shafts 12 in order to contribute in ensuring the free balancing of the pressures applied by the braking pistons.

In order to compensate for the reaction torque due to braking, which would tend to cause each shoe 6 to pivot about its shaft 9, but without destroying the independence of the shoes with respect to each other and without preventing their thermal expansion, each shoe 6 is provided on one edge with a projecting portion 18 and on the other edge with the corresponding cavity 19; each projection 18 of one shoe co-operates, with a certain play of construction, with the corresponding cavity 19 of the adjacent shoe.

The arrangement by which the lining-carrier unit is utilized as a mass to receive heat and is made of beryllium, makes it possible, for the construction of light disc brakes, to dispense with the use of beryllium as the raw material for the discs. It is known that the use of this metal for the discs is dangerous for the reason that the friction to which they are subjected during braking has the effect of producing dust which is poisonous. In order to avoid this danger, the beryllium must be covered with another material, a difficult and expensive process which causes the use of beryllium to lose a part of its advantage. Such a danger is not to be feared with the use of beryllium as a lining-carrier in the brake according to the invention, since this metal is not subjected to any friction.

Another form of brake in accordance with the invention (FIG. 5) comprises rocker-arms 11 actuated by two series of pistons when it is necessary or convenient to separate completely the normal and emergency hydraulic circuits of the aircraft. FIG. 5 shows a brake of this kind.

The rocker-arms 11 may be actuated either by the pistons 21 or by the pistons 22 which act through the intermediary of the flanges 23 at the bottom of the pistons 11. Following a particular arrangement of the invention, the pistons 21 are provided with automatic devices for taking-up wear, known in themselves, but which act also on the pistons 22 through the intermediary of the flanges 23 of the pistons 21. There is therefore only a single system of automatic take-up of wear for the two control systems, normal and emergency.

It will of course be understood that the forms of embodiment described above may comprise numerous alternatives and are given by way of non-limitative examples.

What we claim is:

1. A disc-brake for a wheel mounted on a rotatable axle, said disc-brake comprising three combined units, a first rotating unit comprising at least one braking disc, a second non-rotating unit comprising a plurality of small individual shoes, mechanically independent of each other and mounted for independent pivotal movement about an axis parallel to the axle, each shoe carrying a friction lining which is intimately associated with it without any thermal discontinuity, and a third supporting unit coupling the second unit to the axle, thermally distant from said second unit and including actuating means for said shoes, said actuating means including a plurality of elements, each shoe having opposite ends acted on by respective elements, each element acting on a pair of shoes at adjacent ends thereof.

2. A disc-brake as claimed in claim 1, wherein said third unit comprises a shaft parallel to the axis of the wheel slidably supporting a respective shoe, said shoe-actuating means comprising jacks, said elements acting on the shoes being rocker-arms, each rocker-arm pivoting with a constructional play, on a corresponding shaft of the third unit parallel to the plane of the wheel and perpendicular to a radius of the wheel, by the action of an associated jack and symmetrically actuating the lateral portions of two adjacent shoes, each shoe comprising a projecting member on one lateral edge and a corresponding cavity on the other edge, each projecting member of a shoe being supported, with a constructional play, in the cavity of the adjacent shoe.

3. A disc brake as claimed in claim 1, in which each friction lining is fixed by brazing on one face of its associated shoe, the opposite face of said shoe being formed with cellular cavities.

4. A disc-brake as claimed in claim 1, in which each friction lining is fixed by sintering on one face of its associated shoe, the opposite face of said shoe being formed with cellular cavities.

5. A disc-brake as claimed in claim 1, in which said shoe-actuating means comprise two sets of jacks, one for normal braking and the other for emergency braking, the pistons of the jacks of one of said sets being provided with flanges adapted to actuate the pistons of the jacks of the other set, said latter pistons comprising automatic devices for taking-up wear which are thus effective for both said sets.

6. A disc-brake as claimed in claim 1, in which said second unit is made of beryllium or when so required of beryllium alloy.

7. A disc-brake as claimed in claim 1, in which said third unit is made of magnesium-thorium alloy.

8. A disc-brake as claimed in claim 1, in which said friction linings are sintered linings with a base of copper.

9. A disc-brake as claimed in claim 2, wherein each shoe has a different rocker arm acting on the opposite ends thereof.

10. A disc-brake as claimed in claim 2 wherein said projecting members and cavities on the shoes have smooth, round profiles which interengage with play.

References Cited
UNITED STATES PATENTS

| | | | |
|---|---|---|---|
| 2,497,438 | 2/1950 | Butler. | |
| 2,873,517 | 2/1959 | Wellman | 188—251 X |
| 2,909,244 | 10/1959 | Kraft | 188—251 X |
| 2,989,149 | 6/1961 | Klave | 188—218 X |
| 3,105,575 | 10/1963 | Dewar et al. | 188—218 |
| 3,179,209 | 4/1965 | Lucien et al. | 188—251 |

MILTON BUCHLER, *Primary Examiner.*

G. E. HALVOSA, *Assistant Examiner.*